May 31, 1938. W. B. FAGEOL 2,118,810
MOTOR VEHICLE AND VEHICLE DRIVING MECHANISM
Filed April 6, 1935 6 Sheets-Sheet 2

Inventor
William B. Fageol

By Strauch & Hoffman
Attorneys

May 31, 1938.  W. B. FAGEOL  2,118,810
MOTOR VEHICLE AND VEHICLE DRIVING MECHANISM
Filed April 6, 1935   6 Sheets-Sheet 4
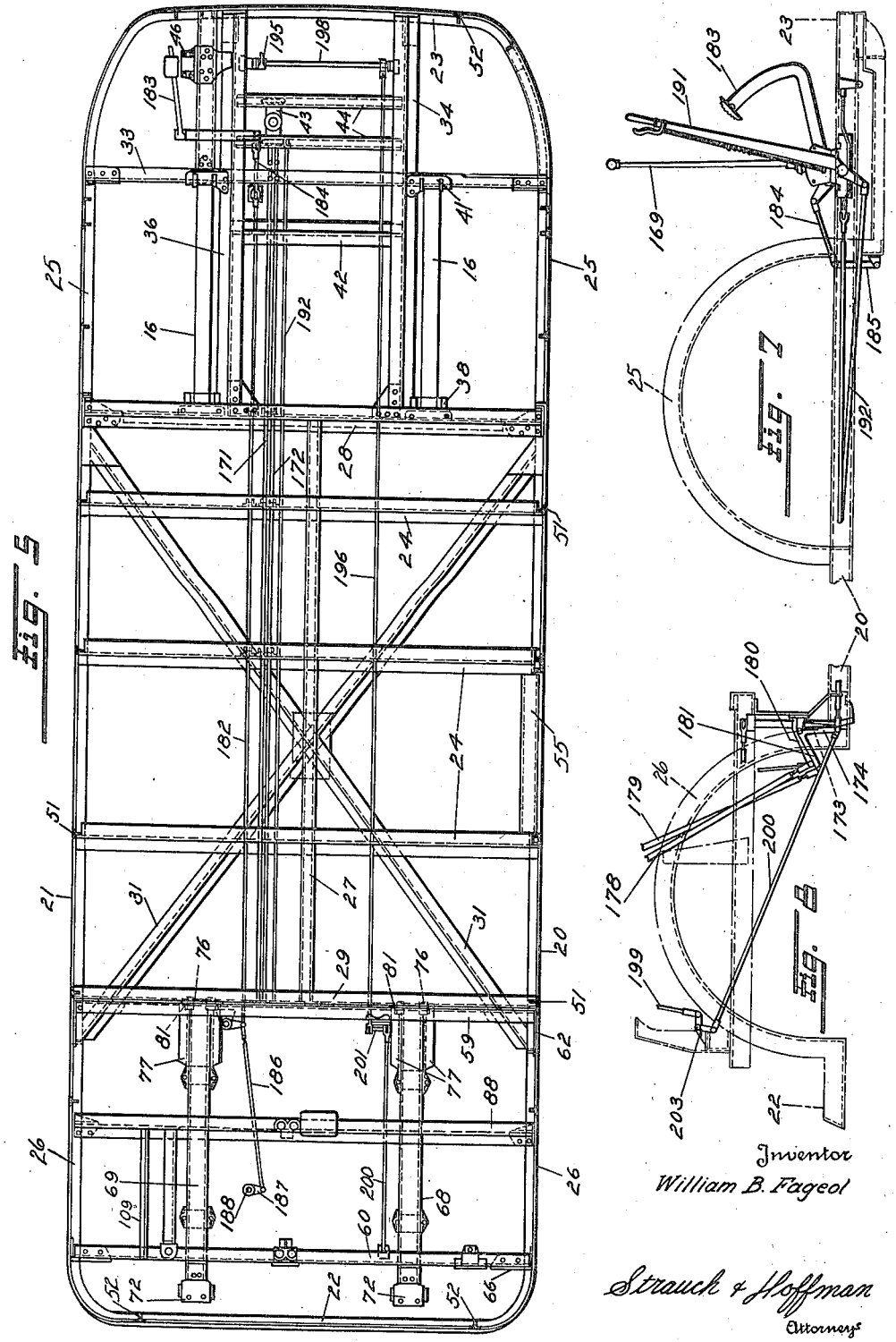
Inventor
William B. Fageol
Strauch & Hoffman
Attorneys

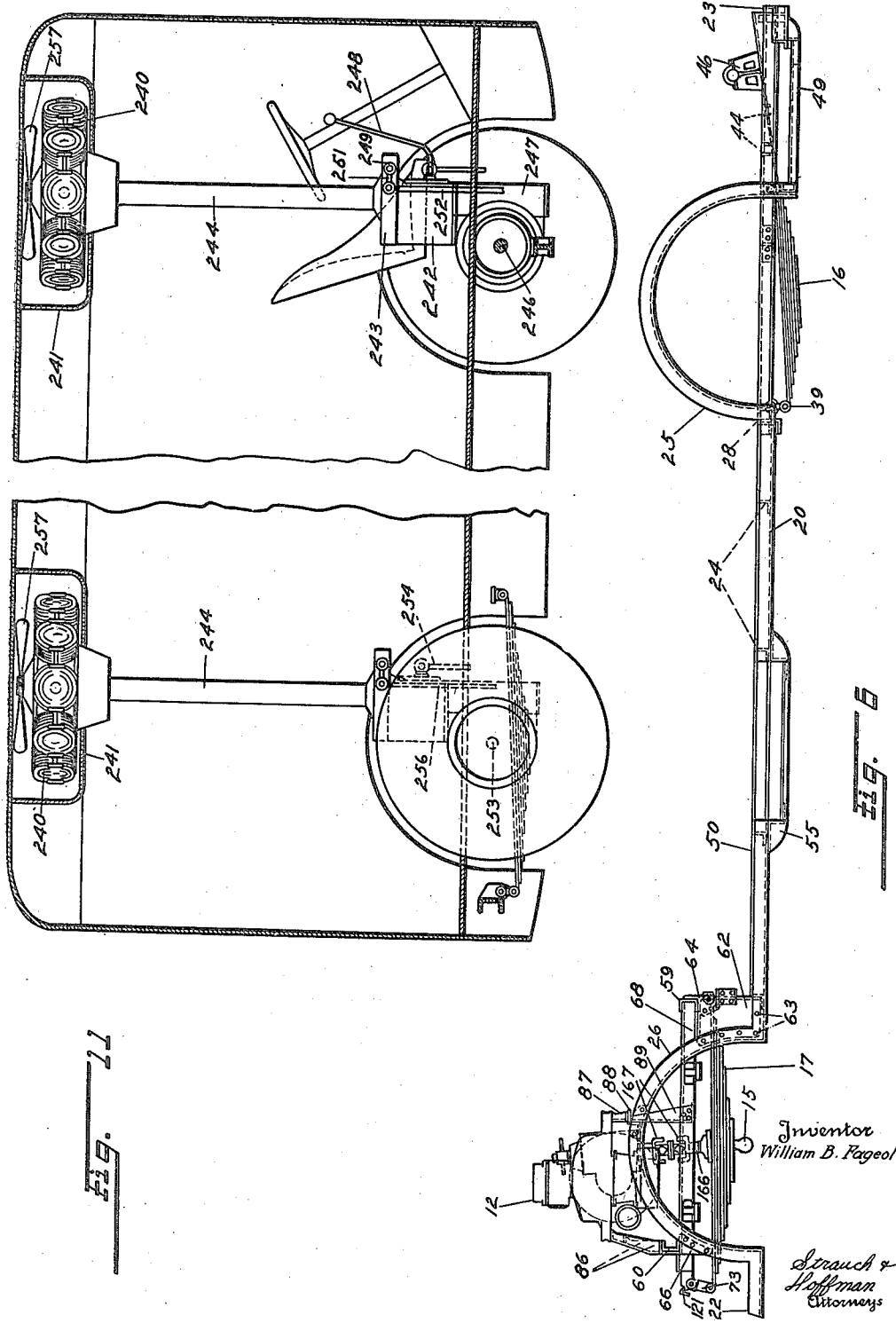

May 31, 1938.  W. B. FAGEOL  2,118,810
MOTOR VEHICLE AND VEHICLE DRIVING MECHANISM
Filed April 6, 1935   6 Sheets-Sheet 6
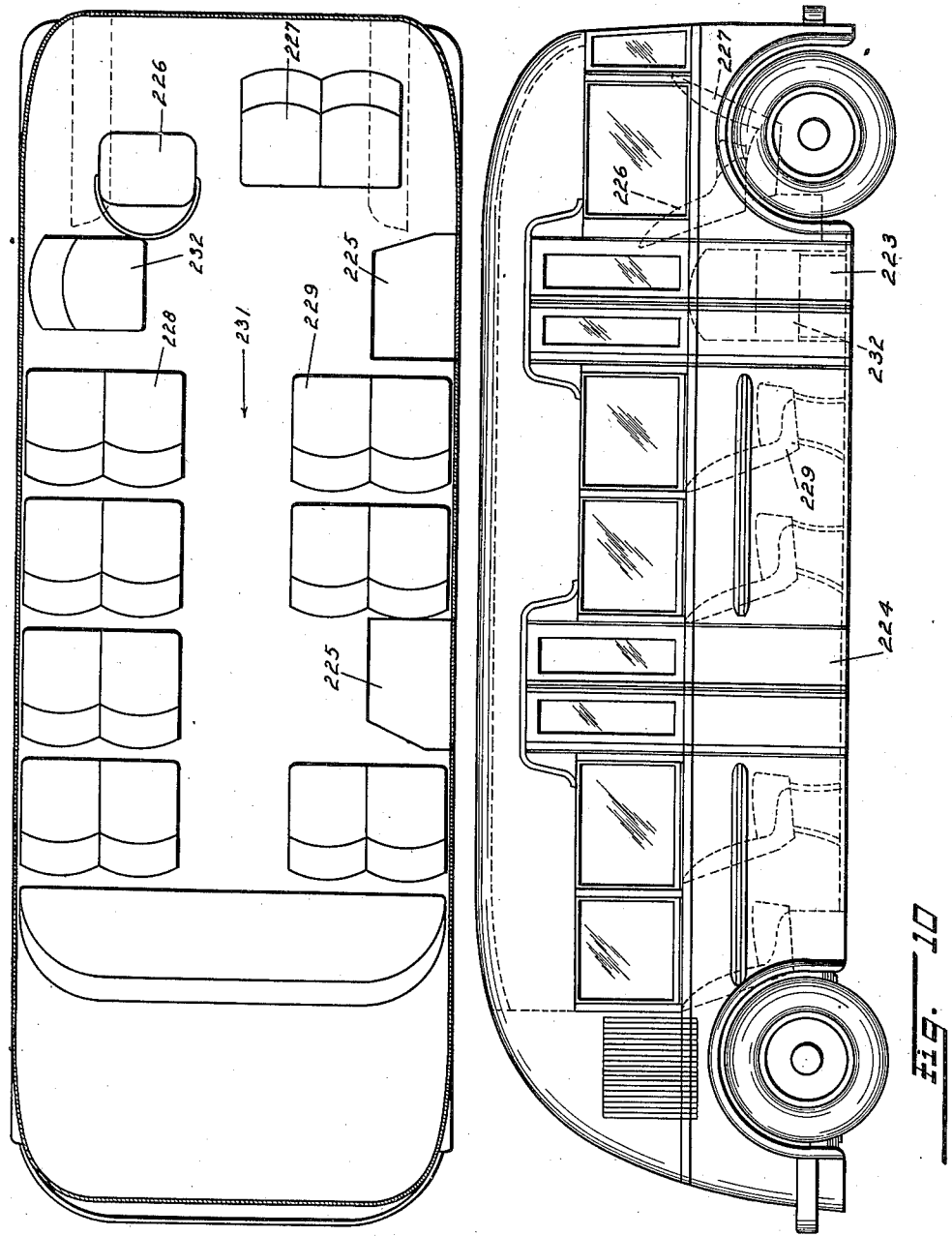
Inventor
William B. Fageol
By   Strauch & Hoffman
   Attorneys Patented May 31, 1938

2,118,810

UNITED STATES PATENT OFFICE 2,118,810

MOTOR VEHICLE AND VEHICLE DRIVING MECHANISM

William B. Fageol, Kent, Ohio, assignor to Twin Coach Company, Kent, Ohio, a corporation of Ohio Application April 6, 1935, Serial No. 15,085

5 Claims. (Cl. 180—54)

The present invention relates to motor vehicles, particularly of the type used for transporting relatively large numbers of passengers. More particularly, the invention resides in the novel disposition of the power plant and drive mechanism for a motor coach, and also in novel body arrangements whereby the size and weight of the coach is reduced for a given passenger carrying capacity.

In motor coaches of the type wherein the power plant is disposed adjacent the rear thereof, the power plant has been located rearwardly of the rear wheels making it necessary to have the vehicle frame extend beyond the rear supporting wheels. As it is not feasible to increase the overall length of a bus unduly, the rear supporting wheels have been moved forward in prior art vehicles employing a rearwardly disposed power plant to avoid increasing the body length. This prior art practice is accompanied by serious disadvantages such as a decreased wheel base for a given length of vehicle, an unsymmetrical arrangement of the vehicle body and load on the wheels, and an undesirable rear overhang of the engine weight. Also, the housings for the rear wheels unduly obstruct the useful floor space in the vehicle unless the floor thereof is located at an inconvenient distance above the ground.

This invention aims to dispose the rearwardly located power plant over the rear axle so that it is possible to locate the rear axle substantially at the end of the body frame and to bring the entire floor level occupied by seats between the axles and below the wheel centers. Also in accordance with the present invention, driving power is transmitted from the power plant to the rear drive wheels of the vehicle by a novel power transmission arrangement which forms the subject matter of a related application.

The novel disposition of the power plant in a motor coach according to the present invention makes possible a balanced construction inasmuch as it is not necessary to project the rear end of the passenger carrying body beyond the rear axle, and the amount by which the front end of the body projects beyond the front axle in a vehicle embodying the present invention is determined by the location of the driver's station and the location of the forward door. In the preferred form, the driver occupies an elevated seat substantially over the forward axle and the front door is positioned either ahead or to the rear of the front wheel. The specific door location will depend to some extent on the size of the vehicle and the character of service to be rendered. Because of the extremely low floor line of vehicles constructed in accordance with teachings of the present invention, it is possible to lower the roof without decreasing the head-room necessary to accommodate standing passengers thus lowering the center of gravity of the vehicle. The power plant, transmission and radiator are above the normal collision line.

Accordingly a primary object of the present invention is to provide a novel rear engine motor coach adapted for the comfortable transportation of a maximum number of passengers for a given size and weight.

A further object of the present invention is to provide a novel motor coach construction embodying a passenger carrying body and a power plant supported in or on the body and over the axle supporting the rear of the body.

A further and related object of the present invention is to provide a vehicle having an especially favorable distribution of the total vehicle weight.

A still further object of the invention is to provide a novel seating arrangement for a motor coach whereby all of the passengers may be seated between the axles supporting the coach.

A still further object of the present invention is to provide a motor coach in which the floor is at or substantially below the level of the wheel centers and accessible to passengers upon taking an easy step from the ground.

A still further object of the invention is to provide a novel rear engine motor coach in which the rear supporting axle is positioned at the end of the body and to the rear of the passenger carrying space thereof.

Another object of the present invention is to provide a motor coach of novel construction in which the weight represented by the power plant and its accessories is borne by the body framing members which lie substantially above the supporting axle driven by the power plant.

Still another object of the present invention is to provide a motor coach body of novel construction having the floor thereof lying in or below the plane of the wheel centers thus permitting the roof of the body to be lowered without sacrifice of head-room necessary for the accommodation of standing passengers.

A still further object of the present invention is to provide a novel vehicle body structure in which the framing members thereof are arranged to support an internal combustion engine and its accessories, and the body walls are arranged to house the engine at one side of a partition dividing the passenger space from the engine housing space.

Still another object of the present invention is to provide a vehicle having a compartment for housing the power plant, its cooling radiator and other accessory equipment in a manner to permit convenient access thereto.

A further and related object of the present invention is to provide a vehicle compartment for housing an internal combustion engine the latter being located above one of the vehicle supporting axles.

A still further object of the present invention is to provide openings in the body wall or walls of a vehicle, located above the zone of dust and road dirt for supplying cooling air to an engine cooling device housed within the vehicle.

A still further object of the present invention is to provide a novel form of bumper in combination with the rear vehicle body wall and the adjacent vehicle framing structure.

A still further object of the present invention is to provide for a novel disposition of the exhaust pipe and muffler in a motor vehicle. As a result of the novel muffler location, a current of heated air flows over the exterior of the rear window of the vehicle thereby keeping the window free from dust and ice.

A still further object of the present invention is to provide a novel heating and ventilating arrangement for a motor vehicle wherein the heat from the exhaust muffler is utilized to heat air circulated within the vehicle.

A still further object is to establish a downwardly flowing current of air over the interior of the vehicle glass of a motor coach whereby to aid in checking the formation of frost on the glass.

Further objects of the invention will appear from the following description and appended claims when taken in connection with the accompanying drawings wherein:

Figure 4 is a diagrammatic sectional top plan view of the interior of the vehicle of Figure 1 showing the arrangement of the seats and door openings.

Figure 5 is a top plan view of the body frame construction.

Figure 6 is a view in side elevation of the frame construction shown in Figure 5.

Figures 7 and 8 are diagrammatic views of details of the control mechanism.

Figure 9 is a diagrammatic view similar to Figure 4 but showing a modified seating and door arrangement.

Figure 10 is a view similar to Figure 1 illustrating the exterior of the modified vehicle of Figure 9, and Figure 11 is a longitudinal vertical sectional view of another form of vehicle embodying the present invention.

Like reference characters indicate like parts throughout the several figures.

Figure 1:
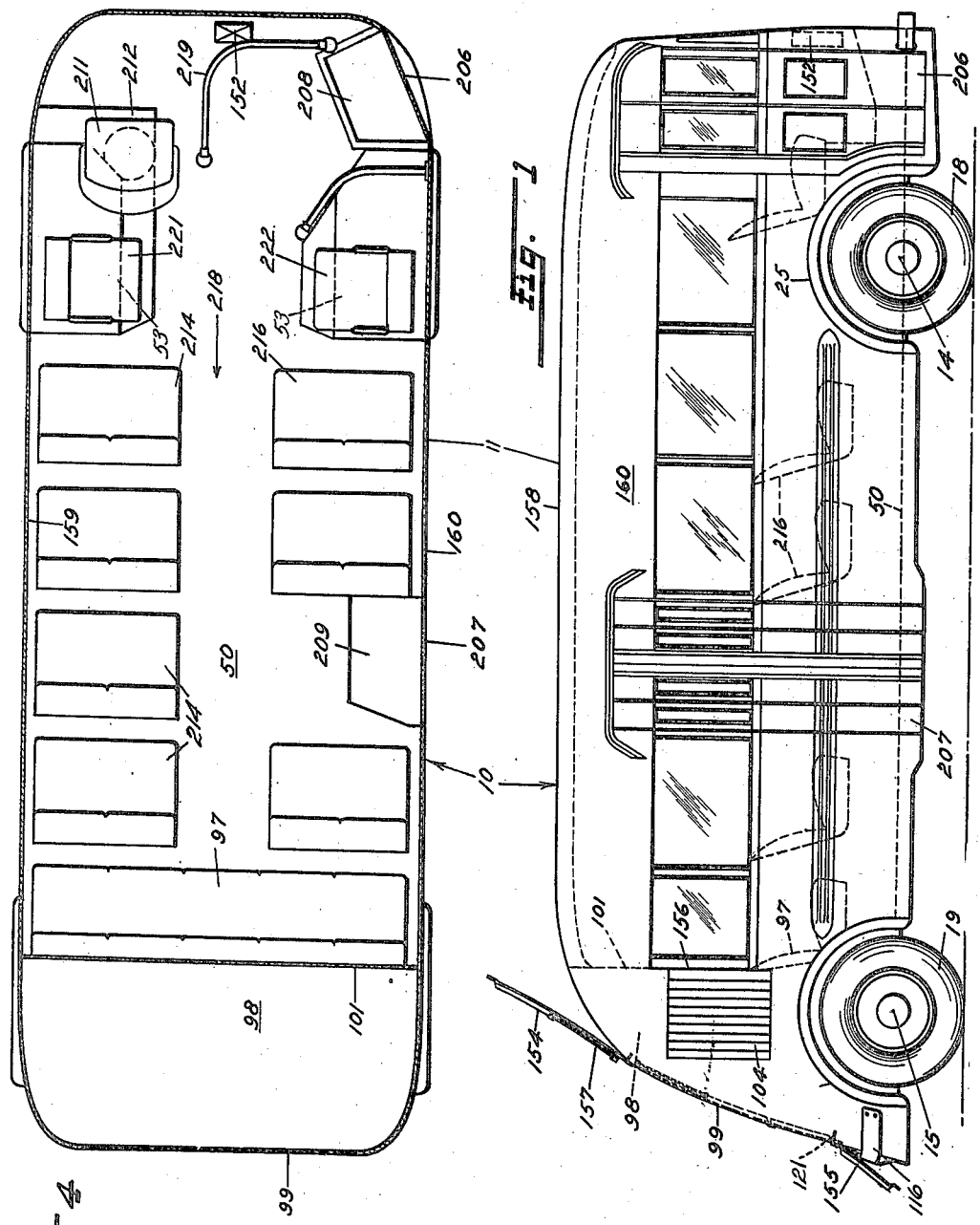
Figure 1 is a view in side elevation of a passenger vehicle embodying the present invention.

Referring to the accompanying drawings, and for the present particularly to Figures 1 to 5, the vehicle 10 constructed in accordance with the present invention has a passenger carrying body 11 of substantially box-like form which is preferably constructed in such a manner that it is capable of sustaining the load of the power plant and its accessories which are positioned in a novel manner above the vehicle drive axle. The power plant in the embodiment chosen for illustration is composed of an internal combustion engine 12 and the mechanical transmission means for imparting power to the driven vehicle wheels. It will be understood, however, that it is within the scope of the present invention to employ electrical or other means of power transmission with the main power plant disposed in the vehicle in the novel manner to be described. The body 11 is supported on a front axle 14 and a rear drive axle 15 by springs 16 and 17 which are shackled to certain of the body frame members in a manner to be described. The front wheels 18 are connected to the axle 14 in any well known manner to provide for steering of the vehicle and in the embodiment shown, the rear wheels 19 serve to drive the vehicle on the roadway.

The body framing members adjacent the rear of the vehicle are arranged in a novel manner to support the power plant in position above the drive axle, and the body is constructed to provide space for its accommodation. The base frame of the vehicle to which the body sides and ends are rigidly connected is illustrated in Figures 5 and 6 and includes longitudinal frame members 20 and 21 which lie substantially in the plane of the body sides. The members 20 and 21 may be continuous around the rear of the body 11 to form the end frame member 22. An end frame member 23 for the front of the vehicle body may be provided in a similar manner.

A series of transverse members 24 which are substantially in the shape of a Z in cross-section as shown and which vary in number with the length of the vehicle are secured adjacent their ends to the members 20 and 21. The members 20 and 21 are arched at the points 25 and 26 adjacent the front and rear ends of the vehicle to accommodate the wheels 18 and 19. A centrally located longitudinal member 27 of channel shape in cross-section extends from the transverse member 28 adjacent the rear of the arched portions 25 to the transverse member 29 in front of the arched portions 26. Diagonal members 31 are secured at their ends to the members 20 and 21 and cross adjacent the center of the vehicle. At the point of intersection of the members 31 they are suitably secured to the central member 27 and serve to impart rigidity to the sub-frame enabling it to resist lateral stresses and twisting stresses.

A transverse frame member 33 is secured at its ends to the members 20 and 21 at the forward end of the arched portions 25. Auxiliary longitudinal frame members 34 and 36 of Z shape in cross-section extend from the transverse member 28 forwardly to the end frame member 23.

Brackets 38 are secured to the transverse member 28 to which the spring shackles 39 are pivotally connected. The forward ends of the forward vehicle springs 16 are pivotally connected to brackets 41 which are secured to the transverse member 33. Each bracket 41 is also secured to the adjacent one of members 34 and 36. The auxiliary longitudinal members 34 and 36 serve to relieve the end connections of the transverse members 28 and 33 of twisting strains imposed by the springs. The auxiliary members 34 and 36 are joined by an additional relatively short transverse member 42. The gear shift control device 43 is supported by short lateral members 44 which are carried by the members 34 and 36.

A bracket 46 which is adapted to support the vehicle steering gear is secured upon an inclined member of channel shape secured at its ends to the forward frame member 23 and the lateral member 33. The sub-frame structure about the door opening is strengthened by an auxiliary frame member 49 which extends beneath the curved continuation of the forward frame member 23. The floor 50 is supported on the members 24 and the front members 34 and 36 and the floor extends substantially from the end member 23 to a point adjacent the front of the rear wheels 19.

It will be understood that the side frame members 20 and 21 and the end frame members 22 and 23 may consist of a single member formed to an appropriate shape to provide a one-piece sub-frame outlining the vehicle body, or these parts and the arched portions 25 and 26 may be made up of separate parts welded or otherwise suitably joined together.

The vertical framing members 51 and 52 for the sides and ends of the body are gussetted to the side and end frame members at appropriate places. The upright members 51 of the side frame and the upright members 52 of the end frames are joined together in the super-structure of the coach so that the side and end frames for the body serve to stiffen the sub-frame.

The forward wheels are enclosed by wheel housings 53 secured to the arched frame portions 25 and to the transverse frame members 28 and 33.

In the type of vehicle illustrated in Figures 1 to 4, the side frame member 20 is interrupted at the door opening located between the front and rear wheels so as to provide a shallow step-well. The sub-frame is reinforced at this point by a drop frame member 55. In the vehicle body in its preferred form the floor 50 will be located within an easy step from the ground as illustrated by Figure 1 of the drawings. In the vehicle of Figures 9 and 10 to be later described, it is unnecessary to interrupt the side frame member 21 and the forward frame member 23 which are substantially at the same level, to provide for door openings.

The vehicle framing members adjacent the rear of the body are arranged in a manner to support the transversely located power plant substantially above the vehicle drive axle, and to that end a pair of elevated transverse members 59 and 60 are provided. The member 59 is supported adjacent each end by means of brackets, each of which may consist of a plate bent so as to have flat portions at right angles to each other. One of the flat portions 62 of each bracket is secured to the vertical web of the side frame member 20 or 21 and also against the vertical web of one of the arched portions 26 of the side frame by fastening means 63. The other flat portion 64 of the bracket is secured against the vertical web of the transverse member 29 and the elevated transverse member 59.

The transverse member 60 is secured at each end to one of the arched portions of the side frame 26 by means of brackets 66 each having a vertical portion which is riveted or otherwise secured to the vertical web of the arched portions 26, and is also provided with an inturned horizontal flange upon which an end of the member 60 rests and to which it is secured as by rivets.

Relatively short longitudinal members 68 and 69 extend rearwardly from the transverse member 29 to which they are secured at one end. At their other end these members 68 and 69 extend beyond the elevated transverse member 60 beneath which they are secured. The projecting portion of each relatively short longitudinal member forms a support for one end of one of the rear vehicle springs 17 and for this purpose the projecting portions are provided with brackets 72 in which one end of one of the spring shackles 73 is pivoted. Each spring 17 is pivotally secured to the other end of each shackle 73. Pivotal connections for the front end of each of the springs 17 are provided by means of inverted U-shaped brackets 76 which are secured to the underside of the elevated transverse frame member 59. In order to relieve the brackets 76 and the transverse member 59 of torsional stresses imposed by the springs during heavy load periods, tension members parallel to each spring at the point of support are provided. These tension members consist of short lengths of angle iron 77 secured to each side of the longitudinal member 68. The forwardly projecting ends of the angle bar members are secured to the downwardly depending sides of the U-shaped brackets. The brackets 76 adjacent the longitudinal member 69 are likewise braced in this manner by angle bars 77. To further strengthen the spring support for the front end of the spring, if desired, short vertical angle bars 81 may be provided extending from the lower end of the depending legs of the U-shaped brackets 76 to the web of the transverse member 29.

The power plant which comprises the internal combustion engine 12 and the casing 84 for the transmission and clutch mechanism is supported at one side upon brackets 86 of which two are provided and which rest upon the elevated transverse member 60. Another similar bracket 87 is secured to a transverse member 88 of Z shape in cross-section. This member 88 is connected at its ends to the arch portions 26 of the side frames and is additionally supported between its ends by means of angle brackets 89 which are secured to the longitudinal members 68 and 69 and the vertical web of the member 88.

The engine 12 and the casing 84 are provided with brackets 91 which are connected to the supports 86 and 87 by noise suppressing means including rubber or other suitable resilient material. The casing 84 is supported at its end upon a cross member 93, which is secured to the transverse members 88 and 60 by suitable noise suppressing connecting devices.

By reason of the novel power plant location just described, substantially the entire space above the drive wheels 19 at the extreme rear end of the vehicle body is occupied by the power plant which eliminates the necessity for having the wheel housings project into and interrupt the continuity of the passenger carrying portion of the body. The entire useful passenger carrying space of the vehicle therefore lies between the front and rear wheels and the floor 50 is level and free from interfering projections. The floor 50 may be made as low as desired since it can end in front of the rear wheels without any sacrifice of useful floor area.

A panel 96 extends upwardly from the floor 50 to the elevated transverse member 59 and serves to enclose the rear end of the passenger compartment of the body from the floor line to the front of the rearmost seat or group of seats 97 which are located forwardly of the rear wheels 19.

A compartment 98 for the power plant and all of the equipment is enclosed between the sloping rear wall 99 of the vehicle and an inner wall 101. The rear wall 99 slopes downwardly to the end member 22 of the vehicle frame to which it is secured. Mounted on the engine 12 and driven therefrom are the usual accessories such as the starting motor, electric generator and a fluid compressor for operating the auxiliary equipment of the vehicle. The cooling radiator 103 for the engine in the embodiment of the invention shown is mounted in an elevated position in the compartment 98 at one side of the engine and adjacent the side wall of the vehicle over the rear wheel housing. The radiator in this position is favorably disposed to be cooled by clean cool air, as will be pointed out, and its location does not interfere with other equipment in the compartment 98. Louvres 104 are provided in the body side wall in line with the elevated radiator through which air is drawn by the fan 106 driven from the engine crankshaft by means of a pulley 107 and the driving belt 105. The air drawn in by the fan may be exhausted through similar louvres in the opposite side wall of the vehicle if desired. A natural draft assisting the action of the fan 106 may be secured by having the opening of the set of louvres adjacent the radiators faced toward the front of the vehicle while the openings of the louvres in the opposite side of the vehicle face toward the rear. It is to be noted that the louvres are located in the body wall above the dirt line so that clean air is drawn in for engine cooling purposes and for ventilating the compartment 98. The storage battery 108 is located above the wheel housing in a position opposite the radiator 103 in the compartment 98. The battery rests upon a supporting frame composed of the angle bars 109 and 111, the frame being supported at one end upon the member 60 by means of a vertical member 112. The fuel tank 114 is disposed in the bottom of the compartment 98 just in front of the rear wall 99 and the opening in the filler pipe 115 is conveniently accessible upon opening the compartment.

The rear of the vehicle is provided with a novel bumper arrangement for preventing scarring of the body walls 99 and for absorbing shocks in the event of a rear collision. The bumper arrangement comprises horizontal members 116 at each side of the vehicle. Each member 116 is secured at one end thereof by suitable means as rivets 117 to the arched portion 26. The opposite end of each member 116 is secured to a relatively flexible vertical member 119. The vertical members 119 and the vertical members 120 which are spaced between members 119 are all secured to a body framing member 121, which extends across the vehicle at the rear. The members 119 and 120 are slotted at their lower end to receive headed fastening means 123 which project outwardly from and are secured to the rear transverse member 22. The slotted connection at the lower end of the vertical members permits these members to deflect in the event of a collision. An important feature of the bumper arrangement just described is that it affords no foothold for children or unauthorized persons for hanging on to the rear end of the bus. The horizontal members 116 are set relatively close to the body walls so that they will not afford a foothold. It is to be noted that the novel bumper arrangement just described eliminates the necessity of making a shield or guard for the bumper and is strong and durable since it is connected to the framing members for the bus.

The exhaust pipe 125 from the engine 12 communicates with a muffler 126, located in the roof of the vehicle body. To accommodate the muffler, a pocket 128 is formed by carrying the roof down vertically and horizontally and the longitudinal framing members 131 at the end of the vehicle roof extend downwardly and horizontally as indicated by the reference characters 129 and 130 to provide a support for the roof cover. A cover 132 for the pocket 128 provides an air scoop which serves, upon movement of the vehicle, to draw air into the pocket and exhaust it from the pocket 128 and for this purpose the cover 132 is spaced outwardly from the body covering along its edges 134 and 135. An aperture 138 in the end wall of the pocket 128 accommodates the exhaust pipe where it enters the pocket. A clip 139 on the exhaust pipe at one end of the muffler and an iron brace 141 at the other end secures the muffler in position in the pocket 128. The pipe 142 which conducts the exhaust gases from the muffler to the atmosphere projects from the end of the muffler opposite the exhaust pipe 125 through a notch in the cover member 132. It will be noted that the pipe 142 enters the muffler at a point which is offset from the exhaust pipe 125 which will have the effect of trapping the condensed moisture when the cold motor is first started up and prevent it from splattering water on the roof of the coach. A drip cup 144 is provided beneath the opening of the exhaust pipe to collect moisture. The cup 144 may be provided with a suitable drain concealed within the interior of the compartment 98.

The interior of the vehicle body occupied by the passengers is warmed by means of air circulated around the muffler 126 which is heated to a relatively high temperature when the engine is in operation. For this purpose a blower or fan 146 is provided having an intake conduit 147 which communicates with the interior of the body through an opening in the wall 101. The discharge conduit 148 of the fan communicates with the interior of the pocket 128. Two conduits or ducts 149 adjacent each end of the muffler connect the interior of the pocket 128 with the interior of the coach through openings in the wall 101. The fan 146 draws air from inside of the body and blows it into the pocket 128 where it is heated by the muffler and passes out through the conduits or passages 149 back into the body. This action takes place in the upper section of the body with the result that it will blow the heated air straight forward in the upper section. A portion of the air which is drawn from the body through the blower intake 147 is or may be mixed with fresh air entering under the edge 134 of the cover member 132 so that a constant supply of fresh heated air is obtained which mixes with the air drawn from the interior of the coach body. It may be desirable however in some installations to provide a cover over the pocket 128 and beneath the cover member 132 so as to preclude entry of outside air into the pocket 128. The shield or covering 132 will serve to force warmed air down over the window located in the rear of the vehicle, keeping it free from dust and frost.

The heating effect of the arrangement just described is combined in a novel manner with the heating effect of a hot water heater 152 located adjacent the front wall of the vehicle. The heater 152 is provided with circulating water from the cooling system of the internal combustion engine and also includes a fan or other device for forcing air through the heater. Air flows down in back of the windshield in the front wall of the body and is drawn into the heater at its top and is exhausted from the heater toward the rear along the floor line of the vehicle. It is to be noted that the air drawn into the heater 152 is the air which is projected from the ducts 149 so that the arrangement described effects a forced circulation of hot air.

The rear vehicle wall 99 is provided with hinged panels 154 and 155 which may be opened to the full line position illustrated in Figure 1 of the drawings to give access to the power plant and all of its accessories so that they may be readily inspected. The lower panel when it is dropped uncovers the filling connection 115 for the fuel tank. Vision to the rear from the interior of the vehicle is provided by a window located at 156 and set in the inner wall 101 and a window 157 in the hinged panel 154 in line with the window 156. The lower hinged panel may be provided with an illuminated recess for the license plate and with rear lamps and also the necessary wiring for the lamps.

It will be noted that the front wall as well as the rear wall 99 of the vehicle is sloped and blends into the top line of the arched roof 158. The side walls 159 and 160 are likewise blended into the line of the roof which gives the vehicle a graceful and streamlined appearance when viewed from any direction. By reason of the fact that the floor of a vehicle constructed in accordance with the present invention is unusually low, the roof thereof may be brought low without decreasing the head-room necessary for proper accommodation of standing passengers and this permits the overall height of the vehicle to be decreased, lowering its center of gravity and enhancing its streamlined appearance.

The rear drive wheels 19 are driven from the vehicle power plant through the novel driving connection which forms the subject matter of a separate application. The disposition of the power plant within the vehicle body above the rear wheels has been described above and the general relationship of the drive mechanism to the power plant and rear wheels will be described. The details of the drive mechanism are described in detail in my separate application above referred to. The power plant and the associated transmission mechanism is preferably of unitary construction and may, if desired, be substantially like that disclosed in my copending application S. N. 729,115, which was filed in the Patent Office June 5, 1934. The housing 84 for the transmission and the housing for the clutch are either integral or are made separately and secured together, the former construction being preferred which results in a single housing 84. The housing 84 has an annular flange 162 at its end which is adapted for connection by bolts or other suitable means to the end of the engine housing. This arrangement permits the casing 84 to be secured to the engine in any angular position desired.

The hollow power take-off shaft 163 is driven from a bevel or mitre gear on the final drive shaft of the transmission mechanism, the said gear being in mesh with a bevel gear associated with the shaft 163. One form of mechanism by which the intermeshed bevel gears may derive power from the engine will be apparent from an inspection of the copending application Serial No. 729,115 referred to above. The gears are a part of the novel mechanism described in detail in the application first referred to above, the said mechanism including a shaft which is splined in the shaft 163 and permits it to move axially as the springs 17 are deflected.

A propeller shaft 166 extends upwardly from the differential mechanism in the drive axle 15 and is interconnected with the power take-off shaft 163 through a pair of universal joints 167 of any approved design connected together so as to transmit power with uniform angular velocity. The change speed transmission mechanism, the clutch and the vehicle brake may be placed under control of the operator at the forward end of the vehicle by control means similar to those illustrated and described in my copending application Serial No. 729,115, or by a control mechanism now to be described.

The change speed transmission mechanism is under control of a lever 169 (Figure 7) located adjacent the steering gear for convenient manipulation by the vehicle operator. Two rods 171 and 172 (Figure 5) extend from the box 43 into which the lever 169 projects to the arms 173 and 174 of a pair of bell-crank levers which are pivotally mounted at the rear of the vehicle. The rods 171 and 172 are disposed beneath the floor of the vehicle and preferably pass through the vertical webs of the transverse members of the base frame to conserve space.

Rods 178 and 179 are connected to the bell-crank lever arms 180 and 181 and these rods are connected to control levers which project from the change speed transmission casing and operate the gear shifting devices of the transmission. Control levers which may be operated by the rods 178 and 179 are disclosed in my companion application previously referred to.

The clutch is operated by a rod 182 which is moved axially by a clutch operating pedal 183 through a link 184. A swinging lever 185 causes the end of 182 to move in a substantially straight line in spite of the upward pull of the link 184. The rod 182 transmits its movement to a second rod 186 which by means of its connection to the lever 187 rotates the clutch operating shaft 188.

Figure 2:
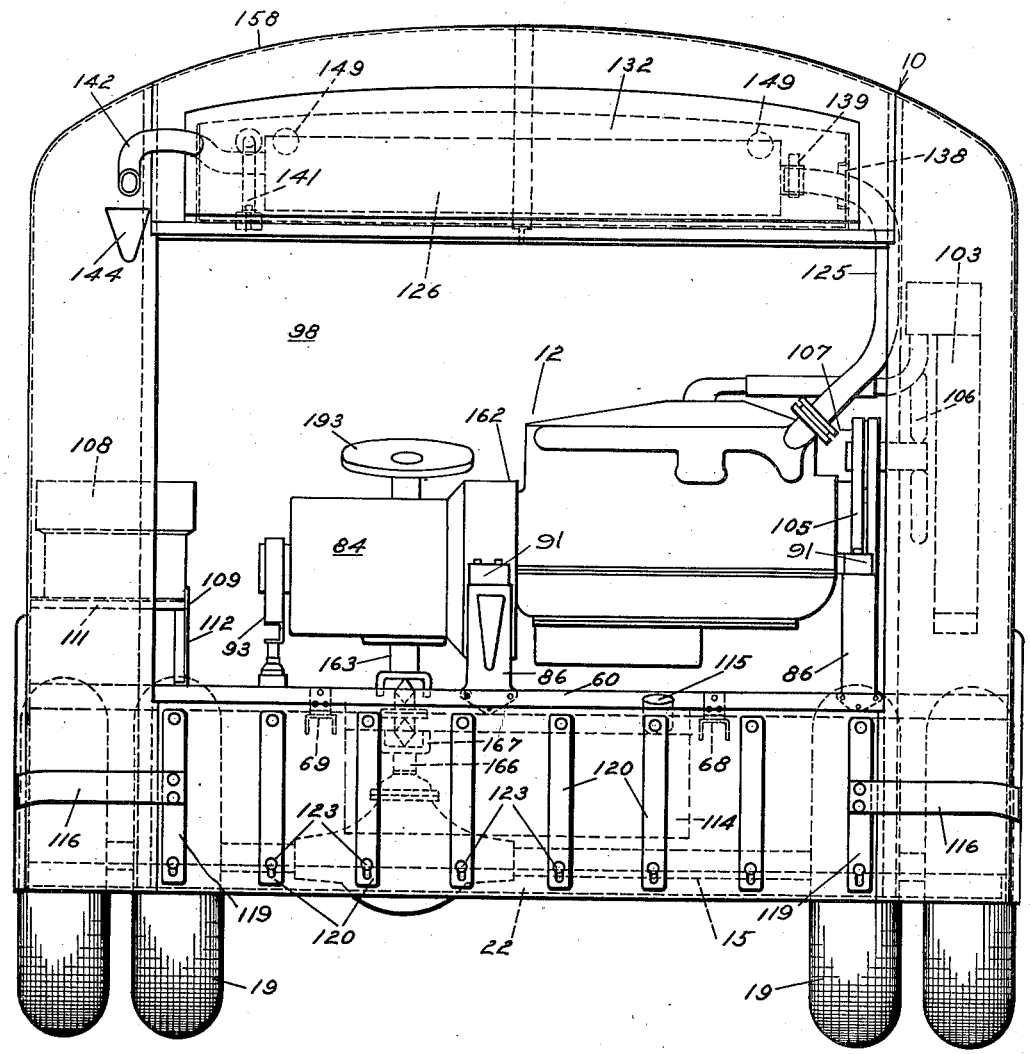
Figure 2 is a view in rear elevation to an enlarged scale of the vehicle construction illustrated in Figure 1.
Figure 3:
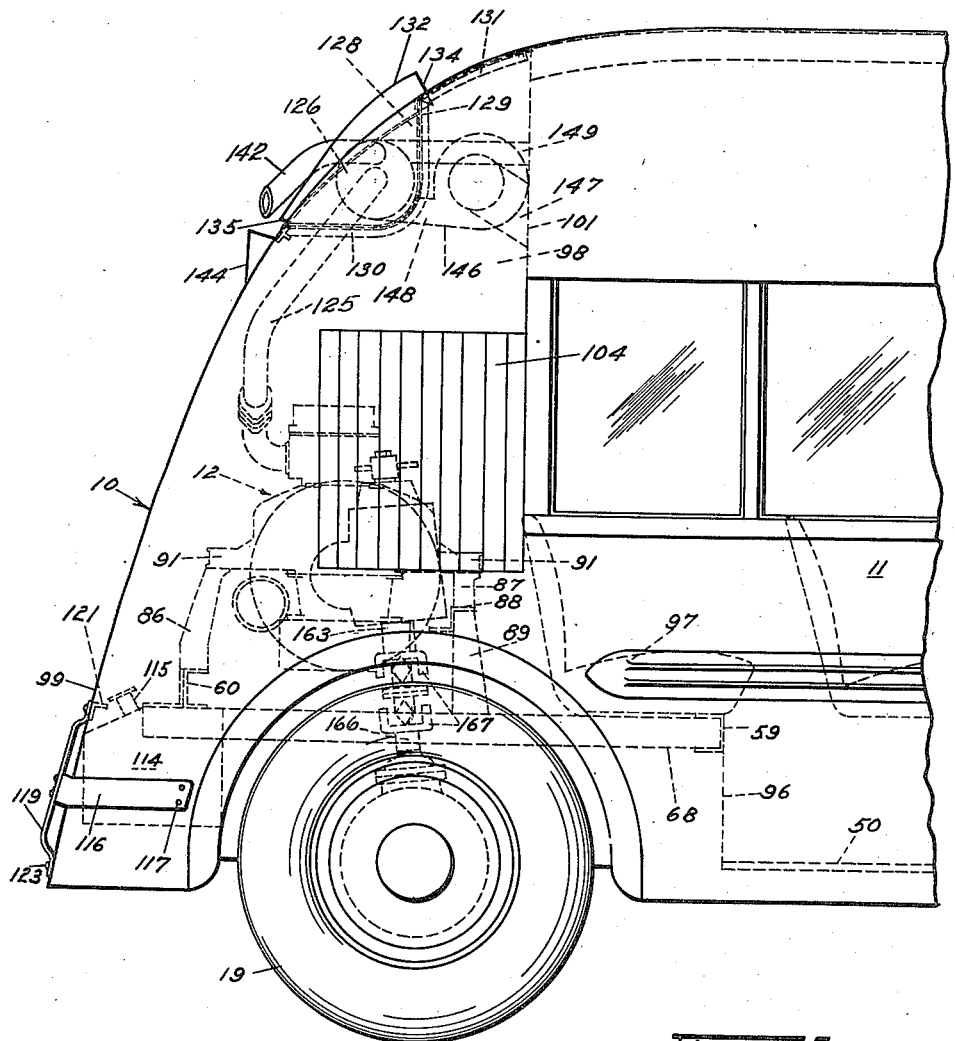
Figure 3 is a fragmentary view to an enlarged scale of the rear portion of the vehicle of Figure 1.

The emergency brake lever 191 serves to operate a pull rod 192 which is connected in any suitable manner with the brake shoes which are adapted to cooperate with the brake disc 193 (Figure 2). The brake disc 193 forms a part of the mechanism which is used to transmit power from the transmission mechanism to the power take-off shaft 163.

The engine throttle valve is operated by a pedal device 195 situated on the floor of the vehicle. A rod 196 is moved by a lever on a rock shaft 198 and the rod 196 transmits movement to a throttle operating rod 199 through a rod 200. Levers on a rock shaft 201 operatively interconnect the rod 196 to rod 200 and a bell-crank lever 203 serves to operatively connect the rod 200 to the operating rod 199.

The control arrangements just described provide for complete remote control of the power plant and drive mechanism which is located in the compartment at the rear of the vehicle. The service brakes for the vehicle are operated in the usual manner by fluid operating means under control of the vehicle operator by a suitable pedal operated valve.

The space longitudinally of the vehicle between the wheels which is available in the body of a vehicle constructed as above described and in accordance with the present invention provides room for a maximum number of forwardly facing passenger seats in a vehicle of given length. The door openings 206 and 207 open into the step-wells 208 and 209. The treads of the step-wells are within easy reach from the roadway and are but very little below the level of the floor 50. The step-wells 208 and 209 may be omitted entirely if the floor height is selected so as to be within one step from the roadway and such a construction is illustrated in Figure 10 of the drawings. It will be appreciated that an extremely low floor is possible in a vehicle constructed in accordance with the present invention inasmuch as the floor height is not governed by the disposition of the power plant and the vehicle driving mechanism. The operator's seat 211 may be elevated as shown upon a raised platform 212 enabling the operator to more readily observe the roadway and supervise operation of the doors and collection of fares.

The seats within the body are preferably arranged as illustrated in Figure 4 of the drawings. A row of forwardly facing double seats 214 is disposed along one side of the body. Other double seats 216 are disposed at the opposite side of the vehicle so as to provide an aisleway 218 between the rows of forwardly facing seats 214 and 216.

The wide passageway 218 extends from the rear group of seats 97 forwardly to the space between the forward wheel housings which latter space is readily accessible from the doorway 206. A hand rail 219 provides a convenient hand hold for passengers entering the vehicle and prevents interference with the operator. Two seats 221 and 222 are mounted over the wheel housings facing each other whereby the space between the wheel housings may be occupied by standing passengers waiting to pay or deposit fares.

The seating arrangement described provides nineteen forwardly facing seats with ample aisle space and space for fare collecting operations. In addition two passengers are comfortably accommodated on the seats 221 and 222, making a total of twenty-one seats, none of which are located in overhanging portions of the vehicle body.

Figures 9 and 10 of the drawings illustrate a modified form of vehicle wherein the floor is of such height as to be readily accessible without the aid of step-wells and in which the position of the end door is altered. The entrance and exit doors 223 and 224 are located between the front and rear wheels of the body, the front wheels being located at the extreme front end of the body. It is to be especially noted that step-wells are not necessary as the floor is level with the bottom of the doors. Reference character 225 indicates treads or plates level with the floor. The driver's seat 226 is located beside the wheel housing at the left side of the vehicle and a rearwardly facing double seat 227 is provided beside the driver's seat. The seat 227 partly overlaps the wheel housing at the right side of the vehicle. A row of seats 228 is located along one side of the body and a similar row of seats 229 is provided at the other side of the body leaving a relatively wide aisle 231 between the seats on each side of the body. A single seat 232 is positioned to the rear of the left hand wheel housing and the operator's seat 226. With the seating arrangement just described an exit is available for practically every passenger in the vehicle and at a distance of not more than three or four steps from the seats which they occupy. It will be noted that the seating and door arrangement just described allows for segregation of the passengers into two groups when this is necessary or desirable. Also, this seating arrangement while making efficient use of the total floor area for the accommodation of seated passengers allows sufficient space adjacent the operator's station to care for standing passengers who have not yet paid their fare.

In the modification of Figure 11, the forward driving engine 240 is located in the roof of the vehicle and is or may be housed in by a cover 241. The engine 240 drives the transmission mechanism 242 through the clutch 243. The power shaft extending between the clutch 243 and the engine is contained within a tubular member 244 which may serve as a hand hold for passengers. Driving power is imparted to the driving axle 246 by a driving connection indicated at 247.

The transmission mechanism is under control of the vehicle operator by means of a lever 248 and the clutch is controlled by the rock shaft 249 which is operated by the lever 251 and the link 252.

If desired, the rear axle 253 may also be driven by means of a second engine 240 which is located above the rear axle. The clutch and transmission mechanism for the engine which drives the rear axle are controlled by the rod 254 and the link 256 which are interconnected in a suitable manner with the lever 248 and the link 252. Engines 240 are preferably controlled by a single throttle control device.

Each engine 241 is shown as being of the air cooled type and provided with a fan 257 to force cooling air to pass around the cylinders. Suitable openings are provided in the roof of the vehicle to permit forced circulation of cooling air under the influence of the fan 257. It will be understood however that the engine cylinders may be jacketed for cooling in the usual manner and the fluid circulated in the jackets may be cooled by a cooling radiator.

While I have illustrated in Figure 11, a vehicle having front and rear driving axles, it will be understood that either the front axle 246 or the rear axle 253 may be the driven axle.

It will be seen from the foregoing complete disclosure of my invention that a vehicle driving arrangement is provided which permits the vehicle to be constructed in the lightest possible manner and with a floor as low as may be desired. Also the wheel base for a vehicle of given length is increased by utilizing the driving arrangement forming part of the present invention and it is to be especially noted that overhang of the vehicle body is eliminated. The passenger seats on a coach constructed in accordance with the teachings of the present invention may be located between the vehicle wheels eliminating troublesome wheel housing interference. Because of the low vehicle floor, the roof of the coach may be lowered decreasing the head-room which is necessary to accommodate standing passengers.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A motor vehicle comprising a body having a passenger seating space with floor level substantially in the plane of the wheel axes, front and rear road wheels supporting said body, a power plant disposed transversely within the body directly over the space between said rear road wheels and adapted to be drivingly connected therewith, a partition in said body substantially vertically extensive above the front extremities of said rear wheels for separating said passenger seating space from the portion of said body housing said power plant, driving means behind said partition and connected between said power plant and said rear wheels, said driving means being disposed substantially in the vertical plane of the wheel axes, and the rear end of the body being disposed closely adjacent the power plant and the rear extremities of the rear wheels, whereby said body comprises a power plant compartment located wholly directly over the rear wheels and a passenger compartment disposed entirely forwardly of the rear wheels.

2. A motor vehicle comprising front and rear road wheels, a body including a passenger compartment supported on said wheels, said body being provided with a substantially vertical transverse partition adjacent said rear wheels to form an engine compartment behind said passenger compartment, said partition and the rear wall of said body having aligned observation openings for providing a line of sight to the rear of said vehicle from said passenger compartment, an engine disposed over said rear road wheels below said line of sight, and a device receiving the exhaust from the engine, said device being disposed in the upper part of the engine compartment above said observation openings.

3. A motor vehicle comprising front and rear sets of wheels; a full width body comprising a pay-load compartment having a floor level at substantially the plane of the wheels' axes and terminating closely adjacent the front extremities of the rear wheels, and a power plant compartment complemental to the rear end of said pay-load compartment and disposed over the axis of the set of rear wheels, said power plant compartment being sufficiently wide to overhang the lateral extremities of the rear wheels and of such dimension longitudinally of the vehicle as to slightly overhang the rearward extremities of said rear wheels; and a power plant mounted within said compartment and comprising a transverse engine and auxiliaries therefor disposed directly above said rear wheels and the axis thereof.

4. A motor vehicle comprising front and rear wheels, a body supported on said wheels and including a pay-load compartment disposed forwardly of the axis of the rear wheels and slightly overlapping the latter, a power plant mounted in the rear of said body and comprising a combustion engine transversely disposed directly above said wheel axis, a radiator at one end of said engine and located directly over a rear wheel at one side of the vehicle, means for causing air to circulate through said radiator, power plant auxiliaries located at the opposite end of the engine just above a rear wheel at the other side of the vehicle, and a transverse fuel tank compactly slung below the rear edge of said engine, said power plant, fuel tank and the rear end of said pay-load compartment forming an arch over and snugly conforming to the top of the cylindrical space between the rear wheels.

5. A motor vehicle comprising front and rear wheels, a body supported on said wheels and including a pay-load compartment disposed forwardly of the axis of the rear wheels and slightly overlapping the latter, a power plant assembly mounted in the rear of said body and comprising an axially aligned engine and clutch and transmission mechanisms, said power plant assembly being disposed directly above said rear wheels with its longitudinal axis spaced from and parallel to the axes of said rear wheels, a radiator at one end of said engine and located directly over one of said rear wheels, and means for causing air to circulate through said radiator.

WILLIAM B. FAGEOL.